United States Patent [19]

Suzuki

[11] 3,983,456
[45] Sept. 28, 1976

[54] PHASE COMPARISON PROTECTIVE RELAY FOR A TRANSMISSION

[75] Inventor: Kenji Suzuki, Kobe, Japan

[73] Assignee: Mitsubishi Denki Kabushiki Kaisha, Tokyo, Japan

[22] Filed: June 11, 1974

[21] Appl. No.: 478,371

[30] Foreign Application Priority Data
June 11, 1973 Japan............................. 48-65603

[52] U.S. Cl. ........................... 317/28 R; 317/29 R
[51] Int. Cl.² ...................... H02H 3/26; H02H 7/26
[58] Field of Search ............. 317/29 R, 29 A, 27 R, 317/28 R, 47 R

[56] References Cited
UNITED STATES PATENTS

| | | | |
|---|---|---|---|
| 3,176,190 | 3/1965 | Hodges | 317/29 R X |
| 3,470,418 | 9/1969 | Hagberg et al. | 317/28 R X |
| 3,590,324 | 6/1971 | Rockefeller | 317/28 R |
| 3,710,189 | 1/1973 | Hagberg | 317/27 R |
| 3,832,601 | 8/1974 | Hinman, Jr. et al. | 317/27 R |
| 3,882,361 | 5/1975 | Hinman, Jr. | 317/27 R |
| 3,893,008 | 7/1975 | Strickland, Jr. et al. | 317/27 R |
| 3,898,531 | 8/1975 | Hinman, Jr. | 317/47 X |

OTHER PUBLICATIONS
"Protective Relaying Scheme for 500kV Systems," Mitsubishi Denki Giho, vol. 45, No. 9, 1126–1140 (1971) by Mikami, Kitaura, Furaya, Amano, Suzuki, Takata, Kobayashi.

Primary Examiner—J D Miller
Assistant Examiner—Patrick R. Salce
Attorney, Agent, or Firm—Oblon, Fisher, Spivak, McClelland & Maier

[57] ABSTRACT

A phase comparison protective relay for a transmission line which comprises a current converter circuit for generating electricity corresponding to the local terminal current; a first device for transmitting a first signal during a period when the instantaneous value of said electricity is positive with respect to a predetermined positive level and for transmitting a second signal during another period; a second device for transmitting a third signal during a period when the instantaneous value of said electricity is positive with respect to a predetermined negative level and for transmitting a fourth signal during another period; a transmitter for transmitting the first and second signals to a remote terminal; a receiver for receiving the first and second signals from the remote terminal; a third device for transmitting a fifth signal when the overlapping period of the third signal and the first signal is longer than a predetermined period; a transmitter for transmitting the fifth signal to the remote terminal; a receiver for receiving the fifth signal from the remote terminal; the third device functioning to transmit the fifth signal when the overlapping period of the third signal and the fifth signal is longer than a predetermined period; and an automatic breaker connected to the transmission line which is opened by the fifth signal transmitted from the local terminal.

3 Claims, 6 Drawing Figures

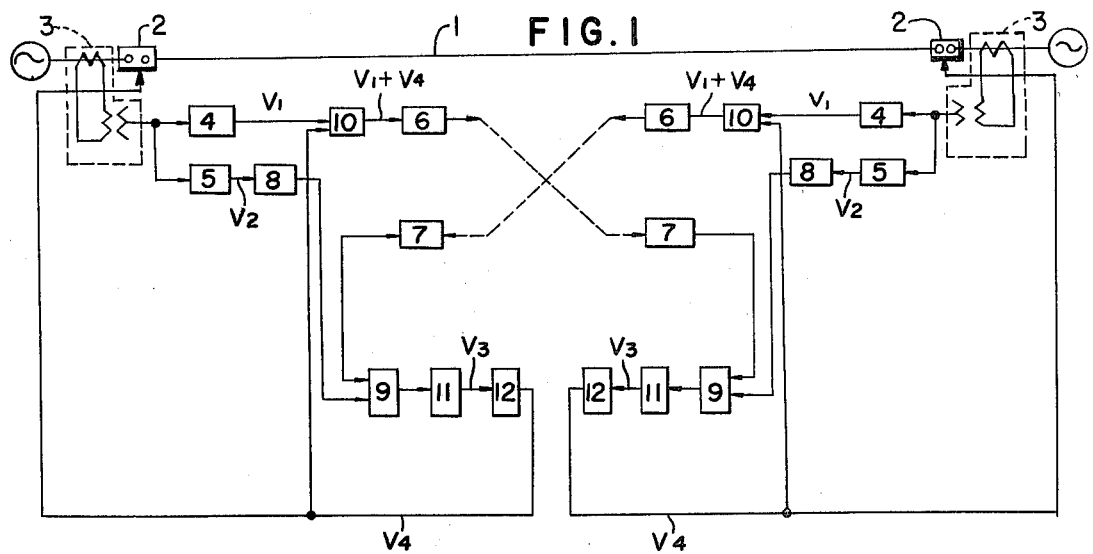
FIG. 1
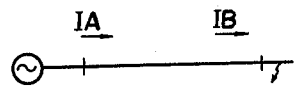
FIG. 2
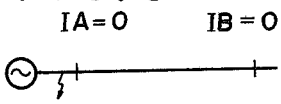
FIG. 3
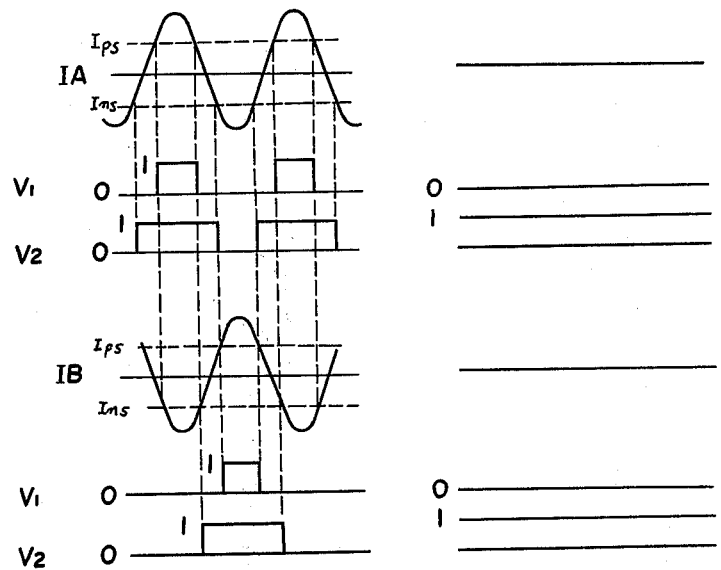

3,983,456

PHASE COMPARISON PROTECTIVE RELAY FOR A TRANSMISSION

BACKGROUND OF THE INVENTION

1. Field of the Invention

The present invention relates to a phase comparison protective relay for a transmission line for detecting an internal fault.

2. Description of the Prior Art

The purpose of a phase comparison protective relay is to detect an internal fault by comparing the phases of current at the terminals of the transmission line. When current is received at both terminals from the internal fault, the internal fault can be easily detected. However, difficulties have been encountered in the so called single source system where current is received at only one terminal from the internal fault. Although these difficulties are relatively easy to deal with where the power source terminal in the conventional single source system is fixed, in a long distance transmission line, the fault currents at both terminals are quite different depending upon where the internal fault point is found in the 500 KV system making it necessary to use variable power sources at both terminals.

SUMMARY OF THE INVENTION

It is an object of the present invention to provide a phase comparison protective relay for protection of the above mentioned system which detects an internal fault when current is received from only a single terminal. The phase comparison protective relay comprises (at each of the terminals in the protective transmission line district):

a current converter circuit for generating electricity corresponding to the local terminal current;

a first device for transmitting a first signal during a period when the instantaneous value of said electricity is positive with respect to a predetermined positive level and for transmitting a second signal during another period;

a second device for transmitting a third signal during a period when the instantaneous value of said electricity is positive with respect to a predetermined negative level and for transmitting a fourth signal during another period;

a transmitter for transmitting the first and second signals to a remote terminal;

a receiver for receiving the first and second signals from the remote terminal;

a third device for transmitting a fifth signal when the overlapping period of the third signal and the first signal is longer than a pedetermined period;

a transmitter for transmitting the fifth signal to the remote terminal;

a receiver for receiving the fifth signal from the remote terminal;

the third device functioning to transmit the fifth signal when the overlapping period of the third signal and the fifth signal is longer than a predetermined period; and an automatic breaker connected to the transmission line which is opened by the fifth signal transmitted from the local terminal.

BRIEF DESCRIPTION OF THE DRAWINGS

A more complete appreciation of the invention and many of the attendant advantages thereof will be readily obtained as the same becomes better understood by reference to the following accompanying drawings, wherein:

FIG. 1 is a block diagram of one embodiment of a phase comparison protective relay for a transmission line according to the invention; and FIGS. 2 to 6 are, respectively, waveforms for illustrating the operation of the embodiments of FIG. 1, wherein like reference numerals designate identical or corresponding parts throughout the several figures.

DETAILED DESCRIPTION OF THE PREFERRED EMBODIMENTS

Figure 4:
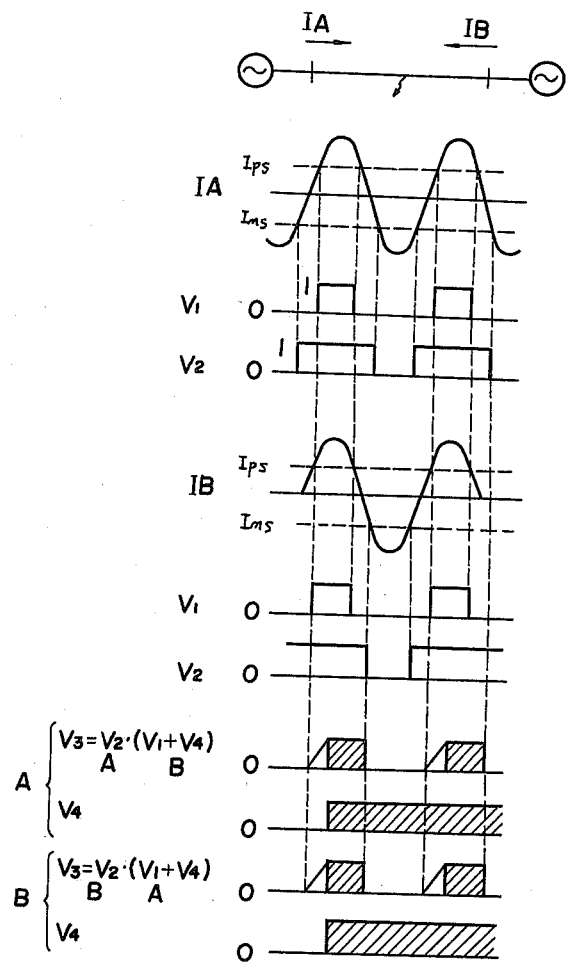

FIG. 1 is a block diagram of one embodiment of the invention wherein the reference numeral 1 designates a two terminal protective transmission line; 2 designates a breaker; 3 designates a current converting circuit comprised of a current transformer for converting terminal current to a suitable quantity of electricity; 4 designates a rectangular wave converting circuit for generating a rectangular wave $V_1$ having a logical 1 signal when the instantaneous value of electricity is positive with respect to a predetermined positive level $I_{ps}$ and having a logical 0 signal when the value is negative with respect to the predetermined positive level; 5 designates a rectangular wave converting circuit for generating a rectangular wave $V_2$ having a logical 1 signal when the instantaneous value of electricity is positive with respect to a predetermined negative level $I_{ns}$ and having a logical 0 signal when the value is negative with respect to a predetermined negative level; 6 designates the transmitting part of a signal transmitter for transmitting rectangular waves $V_1$ and $V_4$.

It is usual to employ a FS system for transmitting the signal by modulating the frequency to $f_H H_z$ when the rectangular wave is a logical 1 signal and to $f_L H_z$ when the wave is a logical 0 signal in the signal transmission of the microwave circuit.

Reference numeral 7 designates a receiving part for receiving a signal transmitted from the transmitting part 6 of a remote terminal; the input rectangular wave at the transmitting part 6 of the corresponding remote terminal is demodulated and generated; 8 designates a rectangular wave delay circuit for compensation of channel delay in the signal transmitting line from the transmitting part 6 of a remote terminal to the receiving part 7 of the local terminal; 9 designates an AND circuit for transmitting a logical 1 signal when both rectangular wave inputs are respectively a logical 1 signal; 10 designates an OR circuit for transmitting a logical 1 signal when either of the rectangular wave inputs is a logical 1 signal; 11 designates a reference circuit for transmitting an output $V_3$ when the period of a logical 1 signal is longer than a predetermined period; 12 designates a break control circuit for controlling the breaker 2 by converting the rectangular wave $V_3$ to a continuous wave $V_4$ and by providing an input to OR circuit 10.

As shown in FIG. 1, phase comparison relays 2–12 are placed at each of the terminals of the two terminal protective transmission line. As is also shown in FIG. 1, $V_3$ is formed to compare $V_2$ at the local terminal and the logical addition of $V_1$ and $V_4$ at the remote terminal.

FIGS. 2 to 6 are, respectively, waveforms illustrating the operation of the embodiment of FIG. 1 with respect to various internal faults in the system.

FIG. 2 shows waveforms under a through outer fault where the same current is passed from the local terminal (A terminal) to the remote terminal (B terminal). The direction of flow of the current in the inner side of the protective transmission line district (from A to B) is the reference direction. The current flows in the same direction as the reference direction at the A terminal. The current flows in the opposite direction to the reference at the B terminal. Accordingly, $I_A$ and $I_B$ in FIG. 2 are opposite.

In FIGS. 1 and 2, when the current $I_A$ flows at the A terminal, the rectangular waves $V_1$, $V_2$ are respectively transmitted from the rectangular wave converting circuits 4, 5 at the A terminal. The signal of rectangular wave $V_1$ is transmitted from the transmitting part 6 through OR circuit 10 to the receiving part 7 at the B terminal. On the other hand, when the current $I_B$ flows at the B terminal, the rectangular waves $V_1$, $V_2$ are respectively transmitted from the rectangular wave converting circuits 4, 5 at the B terminal. The signal of rectangular wave $V_1$ is transmitted from the transmitting part 6 through OR circuit 10 to the receiving part 7 at the A terminal. At the receiving part 7, the signal is demodulated to the original rectangular wave $V_1$ at the B terminal, and is directed to AND circuit 9 at the A terminal. The rectangular wave $V_2$ of rectangular converting circuit 5 at the A terminal is transmitted through the rectangular wave delay circuit 8 to the AND circuit. In the AND circuit 9 of the A terminal, the logical product of $V_2$ at the A terminal and $V_1$ at the B terminal is realized. As is shown in FIG. 2, the logical product is 0. The AND circuit 9 of the B terminal realizes the logical product of $V_2$ at the B terminal and $V_1$ at the A terminal. As is shown in FIG. 2, the logical product is 0. Accordingly, the output $V_3$ is not generated at both the A terminal and the B terminal and the output $V_4$ (continous form of output $V_3$) is not generated. As a result, the phase comparison relay of FIG. 1 is not erroneously operated at both the A and B terminals in the through outer fault of FIG. 2.

FIG. 3 shows the waveforms under a non-current outer fault. In this case, the output $V_3$ is not generated at both A and B terminals and the output $V_4$ is also not generated whereby the phase comparison relay of FIG. 1 is not erroneously operated at both the A and B terminals.

FIG. 4 shows the waveforms under an internal fault where current flows to both terminals. In the AND circuit 9 of the A terminal, a period when the logical product of $V_2$ at the A terminal and $V_1$ at the B terminal is 1 is the rate of 1 per cycle of the power frequency. When the period continues longer than a predetermined period, an output $V_3$ is generated from reference circuit 11. The output $V_3$ is shown at the A terminal in FIG. 4 and the slanted lines show the period continuing longer than the predetermined period. Once the output $V_3$ is generated, the output $V_4$ for continuing the output $V_3$ is generated from the break control circuit 12 whereby the breaker 2 at the A terminal is opened and the output $V_4$ is transmitted from the transmitting part 6 through OR circuit 10 to the receiving part 7 at the B terminal. The output $V_4$ at the A terminal is shown in FIG. 4.

On the other hand, at the AND circuit 9 of the B terminal, a period when the logical product of $V_2$ at the B terminal and $V_1$ at the A terminal is 1 is provided and continues longer than a predetermined period, whereby the output $V_3$ is generated from the reference circuit 11. In the AND circuit 9 of the B terminal, the output $V_4$ at the A terminal is transmitted whereby the logical product of $V_4$ at the A terminal and $V_2$ at the B terminal is detected. The output $V_3$ is shown in FIG. 4 wherein $V_3 = V_2 \cdot (V_1 + V_4)$ (logical product of $V_2$ and $(V_1 + V_4)$).

The tail of the waveform $V_3$ is the logical product of $V_2$ and $V_4$ and is 1. (This is the same as the waveform $V_3$ at the A terminal.) The output $V_3$ is also given at the B terminal and accordingly, the output $V_4$ which is the continuous form of the output $V_3$ is formed whereby the breaker 2 at the B terminal is opened and the output $V_4$ is transmitted from the transmitting part 6 through OR circuit 10 to the receiving part 7 at the A terminal. Thus, both of the breakers 2 at both the A and B terminals are opened and operate without fail at the internal fault shown in FIG. 4.

Figure 5:
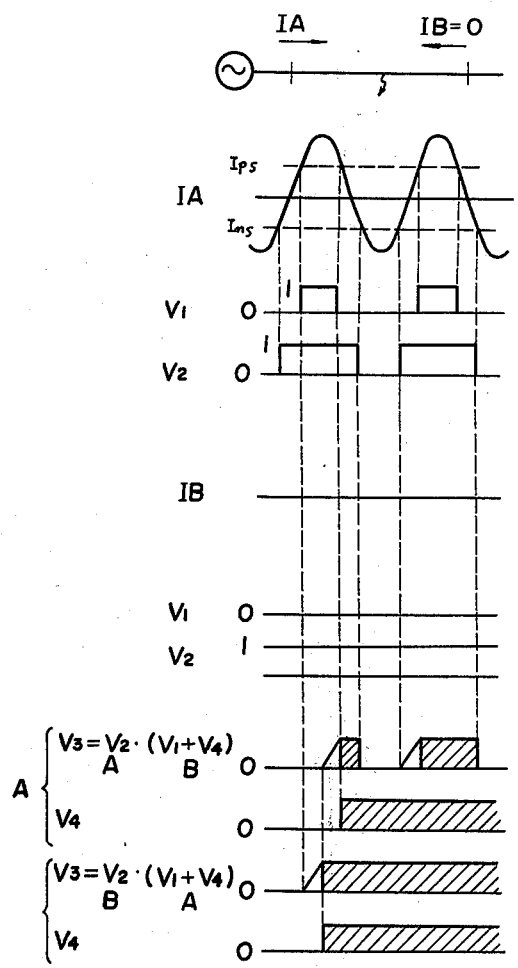

FIG. 5 shows the waveforms under an internal fault wherein current is received at the A terminal and current is not received at the B terminal. The logical product of $V_2$ at the B terminal and $V_1$ at the A terminal can be 1 for a certain period in the AND circuit 9 at the B terminal. When the period of the logical product of 1 continues longer than a predetermined period, the output $V_3$ is generated. Accordingly, the output $V_4$ (continuous for $V_3$) is generated to open the breaker 2 and the output $V_4$ is transmitted from the transmitting part at the B terminal to the receiving part at the A terminal. On the other hand, the logical product of $V_2$ at the A terminal and $V_1$ at the B terminal can not be 1 in the AND circuit 9 at the A terminal. However, the logical product of $V_2$ at the A terminal and $V_4$ at the B terminal can be 1. When the logical product of 1 continues longer than a predetermined period, the output $V_3$ is generated and then the output $V_4$ is generated so as to open the breaker 2. As above mentioned, the phase comparison protective relay of the invention can operate at each of the A and B terminals to open the breaker 2 in the internal fault wherein current is received at the A terminal and current is not received at the B terminal as shown in FIG. 5.

In accordance with the invention, the internal fault can be detected at the terminal where current is not received whereby the result is transmitted to the remote terminal and the internal fault can be detected so as to open the breaker at the terminal where current is received.

Figure 6:
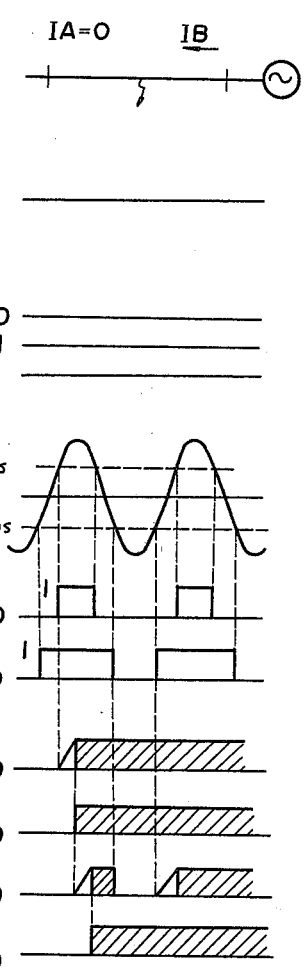

FIG. 6 shows the waveforms under the internal fault wherein current is received at the B terminal and current is received at the A terminal. This is the same as FIG. 5 except the A terminal and the B terminal are interchanged. Accordingly, the relay operates in the same manner to open each breaker 2 at each of the A and B terminals.

In accordance with the invention, the logical 1 or 0 signal $V_4$ is transmitted from one terminal to the other terminal whereby the phase comparison relay having variable power sources at each terminal can detect a fault. The internal fault can be detected without fail and the breaker is opened even though current is received from both terminals or current is not received from either of the terminals. The phase comparison protective relay has the characteristic of no erroneous operation as a result of an outer fault.

For example, the positive predetermined level $I_{ps}$ in the rectangular wave converting circuit 4 and the negative predetermined level $I_{ns}$ in the rectangular wave converting circuit 5 in the phase comparison relay of FIG. 1 can be set as follows:

$$I_{ps} = \sqrt{2} I (\sin 60°) = \sqrt{2} I (\sqrt{3/2}) = \sqrt{1.5} I$$

$$I_{ns} = -\sqrt{2} I (\sin 60°) = -\sqrt{2} I (\sqrt{3/2}) = -\sqrt{1.5} I$$

or the absolute value of $I_{ns}$ is slightly less than $$-\sqrt{1.5} I$$

wherein I represents the minimum current for operation under fault (peak value $\sqrt{2} I$); and a predetermined (continuous) period of the reference circuit 11 corresponds to a 1/6 period of power source waveform.

In the phase comparison protective relay for the transmission line of FIG. 1, when the $V_4$ signal is generated at either of the terminals, the breaker 2 at the terminal from which the signal is transmitted is opened. Moreover, it is possible to open the breaker 2 at the other terminal by transmitting the signal $V_4$ to the other terminal.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A phase comparison protective relay for a transmission line which comprises:
   a local terminal;
   a remote terminal;
   a current converter circuit at the local terminal for generating a local signal corresponding to the local terminal current;
   a current converter circuit at the remote terminal for generating a remote signal corresponding to the remote terminal current;
   first means at the local terminal for transmitting a first signal during a period when the instantaneous value of the local signal is positive with respect to a predetermined positive level and for transmitting a second signal during another period;
   first means at the remote terminal for transmitting a first signal during a period when the instantaneous value of the remote signal is positive with respect to a predetermined positive level and for transmitting a second signal during another period;
   second means at the local terminal for transmitting a third signal during a period when the instantaneous value of the local signal is positive with respect to a predetermined negative level and for transmitting a fourth signal during another period;
   second means at the remote terminal for transmitting a third signal during a period when the instantaneous value of the remote signal is positive with respect to a predetermined negative level and for transmitting a fourth signal during another period;
   a transmitter for transmitting the first and second signals at the local terminal to the remote terminal;
   a transmitter for transmitting the first and second signals at the remote terminal to the local terminal;
   a receiver at the local terminal for receiving the first and second signals from the remote terminal;
   a receiver at the remote terminal for receiving the first and second signals from the local terminal;
   third means at the local terminal for transmitting a fifth signal when the overlapping period of the third signal at the local terminal and the first signal at the remote terminal is longer than a predetermined period;
   third means at the remote terminal for transmitting a fifth signal when the overlapping period of the third signal at the remote terminal and the first signal at the local terminal is longer than a predetermined period;
   said transmitter at the local terminal also functioning for transmitting the fifth signal at the local terminal to the remote terminal;
   said transmitter at the remote terminal also functioning for transmitting the fifth signal at the remote terminal to the local terminal;
   said receiver at the local terminal also functioning for receiving the fifth signal at the remote terminal from the remote terminal;
   said receiver at the remote terminal also functioning for receiving the fifth signal at the local terminal from the local terminal;
   said third transmitting means at the local terminal also functioning for transmitting the fifth signal at the remote terminal when the overlapping period of the third signal at the local terminal and the fifth signal at the remote terminal is longer than a predetermined period;
   said third transmitting means at the remote terminal also functioning for transmitting the fifth signal at the local terminal when the overlapping period of the third signal at the remote terminal and the fifth signal at the local terminal is longer than a predetermined period;
   an automatic breaker at the remote terminal connected to the transmission line, said breaker being opened by the fifth signal transmitted from the local terminal; and
   an automatic breaker at the local terminal connected to the transmission line, said breaker at the local terminal being opened by the fifth signal transmitted from the remote terminal.

2. The phase comparison protective relay according to claim 1 which further comprises a first delay circuit for compensating a period for transmitting a signal between the transmitter at the remote terminal and the receiver at the local terminal, said first delay circuit being disposed between the second transmitting means and the third transmitting means at the local terminal and which further comprises a second delay circuit for compensating a period for transmitting a signal between the transmitter at the local terminal and the receiver at the the remote terminal, said second delay circuit being disposed between the second transmitting means and the third transmitting means at the remote terminal.

3. A phase comparison protective relay for a transmission line which comprises:
   a local terminal;
   a remote terminal;
   a current converter circuit at the local terminal for generating a local signal corresponding to the local terminal current;
   a current converter circuit at the remote terminal for generating a remote signal corresponding to the remote terminal current;
   first means at the local terminal for transmitting a first signal during a period when the instantaneous value of the local signal is positive with respect to a predetermined positive level and for transmitting a second signal during another period;

first means at the remote terminal for transmitting a first signal during a period when the instantaneous value of the remote signal is positive with respect to a predetermined positive level and for transmitting a second signal during another period;

second means at the local terminal for transmitting a third signal during a period when the instantaneous value of the local signal is positive with respect to a predetermined negative level and for transmitting a fourth signal during another period;

second means at the remote terminal for transmitting a third signal during a period when the instantaneous value of the remote signal is positive with respect to a predetermined negative level and for transmitting a fourth signal during another period;

a transmitter for transmitting the first and second signals at the local terminal to the remote terminal;

a transmitter for transmitting the first and second signals at the remote terminal to the local terminal;

a receiver at the local terminal for receiving the first and second signals from the remote terminal;

a receiver at the remote terminal for receiving the first and second signals from the local terminal;

third means at the local terminal for transmitting a fifth signal when the overlapping period of the third signal at the local terminal and the first signal at the remote terminal is longer than a predetermined period;

third means at the remote terminal for transmitting a fifth signal when the overlapping period of the third signal at the remote terminal and the first signal at the local terminal is longer than a predetermined period;

said transmitter at the local terminal also functioning for transmitting the fifth signal at the local terminal to the remote terminal;

said transmitter at the remote terminal also functioning for transmitting the fifth signal at the remote terminal to the remote terminal;

said receiver at the local terminal also functioning for receiving the fifth signal at the remote terminal from the remote terminal;

said receiver at the remote terminal also functioning for receiving the fifth signal at the local terminal from the local terminal;

a breaker connected to the transmission line at the local terminal, said breaker being opened by either the fifth signal at the local terminal or the fifth signal at the remote terminal; and a breaker connected to the transmission line at the remote terminal, said breaker being opened by either the fifth signal at the remote terminal or the fifth signal at the local terminal.

* * * * *

UNITED STATES PATENT AND TRADEMARK OFFICE
CERTIFICATE OF CORRECTION

PATENT NO. : 3,983,456
DATED : September 28, 1976
INVENTOR(S) : Kenji Suzuki

It is certified that error appears in the above-identified patent and that said Letters Patent are hereby corrected as shown below:

Change to show the title from " Phase Comparison Protective Relay for a Transmission" to --Phase Comparison Protective Relay for A Transmission Line--.

Signed and Sealed this

Twenty-first Day of December 1976

[SEAL]

Attest:

RUTH C. MASON
*Attesting Officer*

C. MARSHALL DANN
*Commissioner of Patents and Trademarks*